United States Patent [19]

Brady et al.

[11] 4,073,631

[45] Feb. 14, 1978

[54] STATIONARY DRUM FILTRATION DEVICE AND METHOD

[75] Inventors: Jack D. Brady, Fayetteville; Kenny M. Graves, Atlanta, both of Ga.

[73] Assignee: Andersen 2000, Inc., Atlanta, Ga.

[21] Appl. No.: 658,992

[22] Filed: Feb. 18, 1976

[51] Int. Cl.² .............................................. B01D 46/02
[52] U.S. Cl. .......................................... 55/97; 55/271; 55/315; 55/419; 55/471; 55/498; 55/412
[58] Field of Search ..................... 55/97, 271, 294, 296, 55/299, 315, 418, 419, 471, 482, 498, 510, 528, DIG. 25, 500, 411, 4 R, 351; 210/406, 415, 402, 416 R; 209/285, 300

[56] References Cited

U.S. PATENT DOCUMENTS

| 2,306,074 | 12/1942 | Meyer | 210/402 |
| 2,369,649 | 2/1945 | Abrams | 55/294 |
| 2,678,109 | 5/1954 | Vedder | 55/294 |
| 2,735,510 | 2/1956 | Dooley | 55/302 |
| 3,245,536 | 4/1966 | McKay | 210/402 |
| 3,345,805 | 10/1967 | Sherrill | 55/271 |
| 3,483,675 | 12/1969 | King, Jr. | 55/294 |
| 3,745,748 | 7/1973 | Goldfield et al. | 55/97 |

FOREIGN PATENT DOCUMENTS 353,837  1/1930  United Kingdom ................... 55/294

Primary Examiner—Frank W. Lutter
Assistant Examiner—David L. Lacey
Attorney, Agent, or Firm—B. J. Powell

[57] ABSTRACT

A filtration device and method for removing particulate matter entrained in a gas stream including a filter media with a first prescribed surface area on one side thereof; a perforated support for positioning the filter media so that one side thereof is in communication with the gas stream with the particulate matter entrained therein; a suction head defining a suction inlet therein with a second prescribed cross-sectional area smaller than the first prescribed surface area of the filter media on that side of said filter media opposite the side in communication with the gas stream; a fan for forcing the gas stream into the suction head through the filter media to separate the particulate matter from the gas stream; and drive means for moving the suction head along the filter media so that substantially all of the filter media is eventually used.

11 Claims, 5 Drawing Figures

4,073,631

STATIONARY DRUM FILTRATION DEVICE AND METHOD

BACKGROUND OF THE INVENTION

The removal of sticky, oily or liquid aerosol particulate matter from entrainment in exhaust gas streams in a frequently encountered problem. One method and apparatus that has been successful in removing such particulate matter is disclosed in U.S. Pat. No. 3,745,748. This patent discloses a rotating perforated drum around which a strip of filter media is fed. As the strip of filter media rotates with the drum, the gas stream with the particulate matter therein is drawn through the filter media to separate the particulate matter from entrainment with the gas stream. As the removed particulate matter clogs the filter media around the drum to a prescribed level, the clogged filter media is fed away from the drum. While this rotating drum filtration device has performed satisfactorily, the initial investment cost necessitated by the accessory equipment required to operate such an air filtration device has limited its use to large volume flow rates, usually above 9,000 acfm, in the gas streams in which the particular matter is entrained. Therefore, there has developed a need for an air filtration device which uses a filter media similar to that of the above mentioned patent but which can economically operate in small and medium volume flow rates in the gas streams in which the particulate matter is entrained.

SUMMARY OF THE INVENTION

These and other problems and disadvantages associated with the prior art are overcome by the invention disclosed herein by providing an air filtration device capable of removing sticky, oily, or liquid aerosol particulate matter from exhaust gas streams which can economically operate at low and medium gas stream volume flow rates, which is semi-automatic in operation, and in which the filter media may be changed without interrupting the gas stream flow through the filtration device. Further, the device can be changed to accept different flow rates in the exhaust gas stream while maintaining a face velocity of the gas stream through the filter media within a prescribed velocity range. Further, the invention can be easily adjusted to separate different types and amounts of particulate matter from the exhaust gas stream.

The apparatus of the invention includes generally a housing defining a cylindrical filtration chamber therein, a perforated drum positioned in the housing within the filtration chamber concentrically about the axis of the filtration chamber, filter media about the perforated drum and a suction head rotatably mounted about the central axis of the housing with a suction head inlet adjacent the perforated drum so that the exhaust gas stream entering the filtration chamber outside of th filter media can be drawn through the filter media by the suction head. The suction head is advanced to cause the exhaust gas stream to be drawn through all portions of the filter media about the stationary drum and its rate of rotation is controlled to control the rate at which the filter media is exposed to the gas stream. The outlet to the suction head is connected to an induced draft fan to impose a vacuum in the suction head to draw the gas stream through the filter media and a mist eliminator may be connected to the inlet or outlet of the induced draft fan to separate any large liquid droplets which agglomerate in the filter media and pass out of the suction head in the gas flow.

These and other features and advantages of the invention will become more fully understood upon consideration of the following specification and accompanying drawings, wherein like characters of reference designate corresponding parts throughout the several views and in which:

Figure 1:
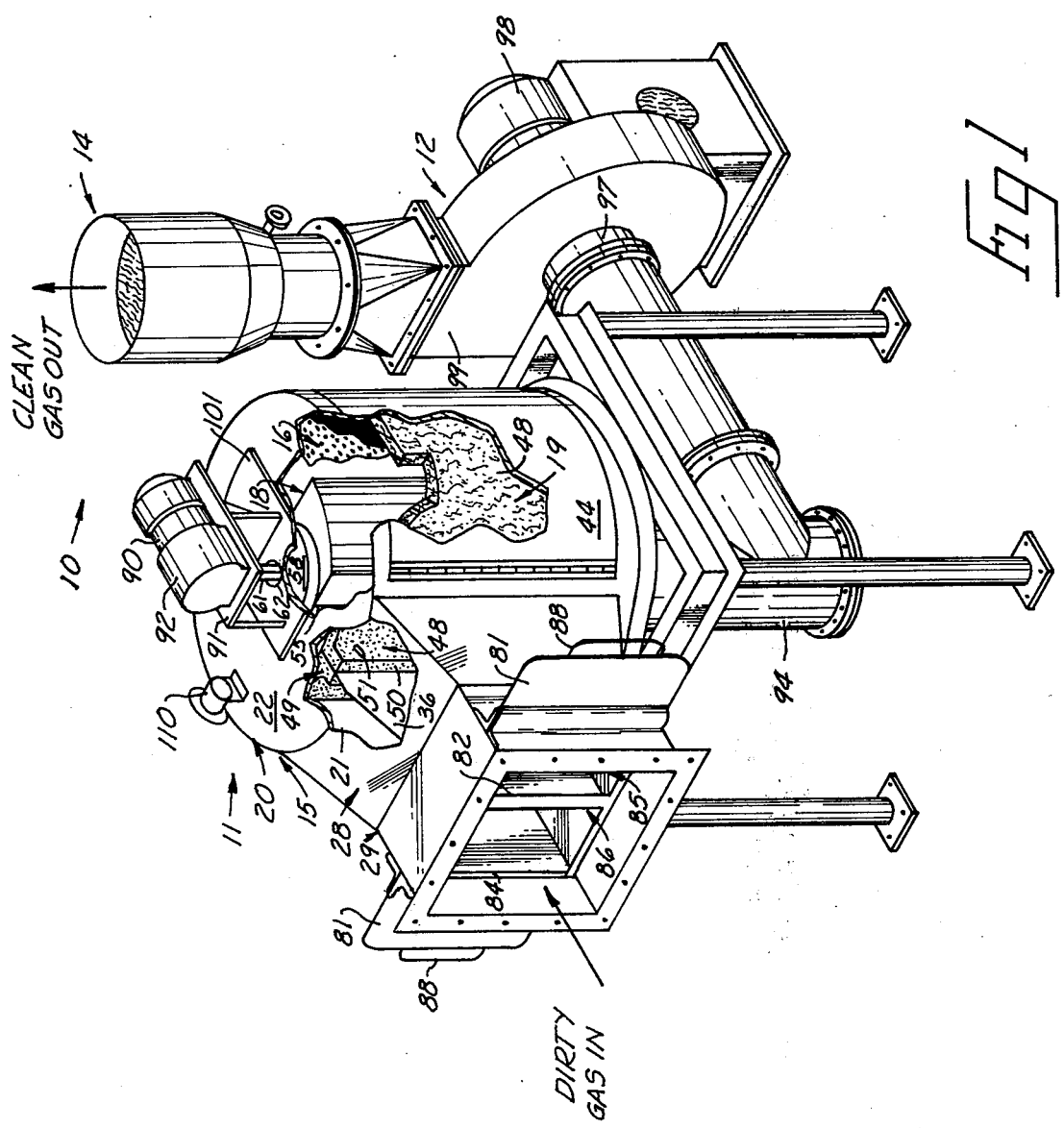
FIG. 1 is a perspective view illustrating the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

The apparatus of the invention is designed primarily for low and medium gas flow rates, usually from zero to 6,000 acfm at its inlet. The air filtration assembly 10, seen in FIGS. 1–4, includes generally a combination filtration and agglomerator device 11 driven by an induced draft fan 12 which in turn discharges through a mist eliminator 14. Both high and low viscosity particulate matter is separated in the filtration and agglomerator device 11. The low viscosity liquid particulate matter separated in the filtration and agglomerator device 11 migrates therethrough and is thrown out of the outlet of the filtration and agglomerator device 11 as larger liquid droplets. These liquid droplets pass through the induced draft fan 12 and are subsequently impacted on the mist eliminator 14 for final removal.

The filtration and agglomerator device 11, best seen in FIGS. 1–4, includes generally a housing 15 into which the exhaust gas stream containing the particulate matter is directed. A perforated support drum 16 is positioned within the housing 15 and a rotating suction head 18 rotatably mounted within the perforated support drum 16 for rotation about its axis. The perforated support drum 16 is covered with filter media 19 so that the suction head draws the gas stream with the particulate matter entrained therein through the filter media 19 as the suction head 18 rotates. The suction head is connected to the induced draft fan 12 to cause the gas stream to be withdrawn therethrough.

Figure 3:
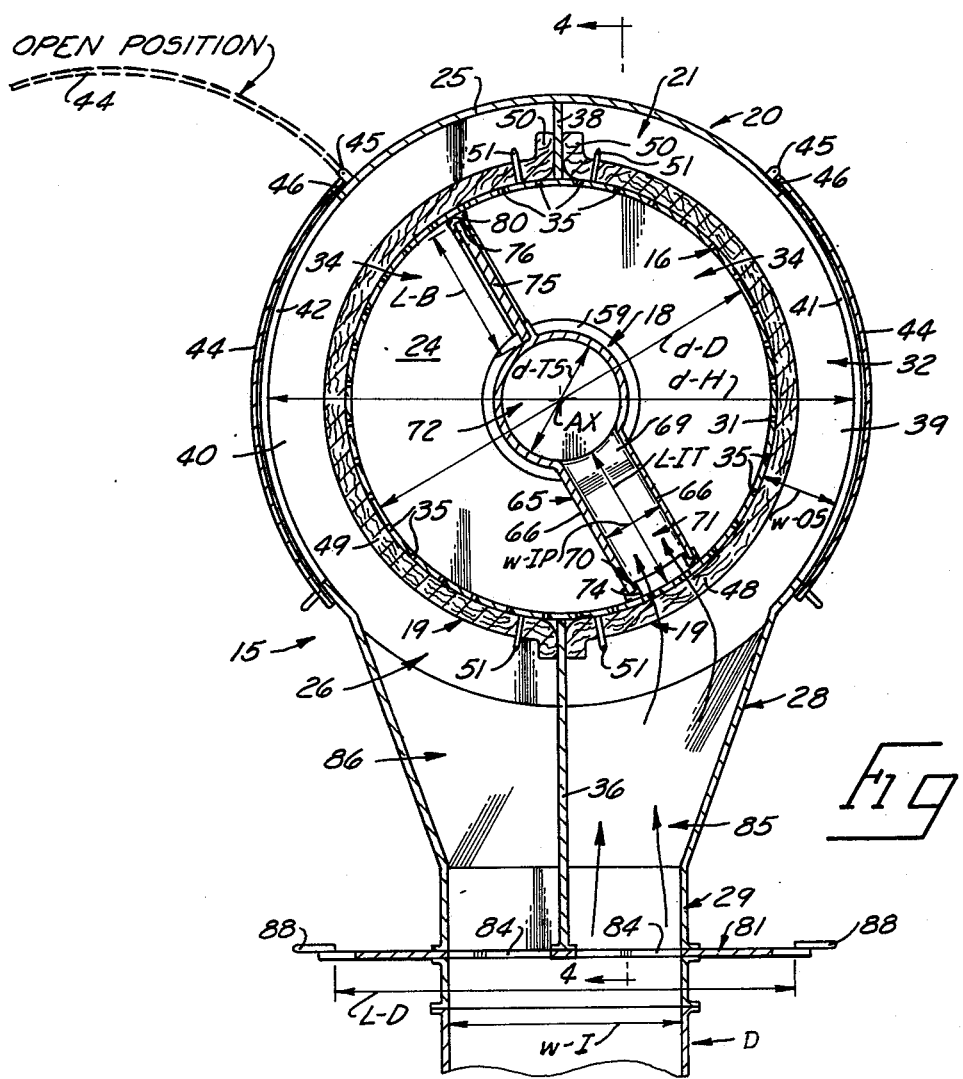
FIG. 3 is an enlarged transverse cross-sectional view taken generally along line 3—3 in FIG. 2.
Figure 4:
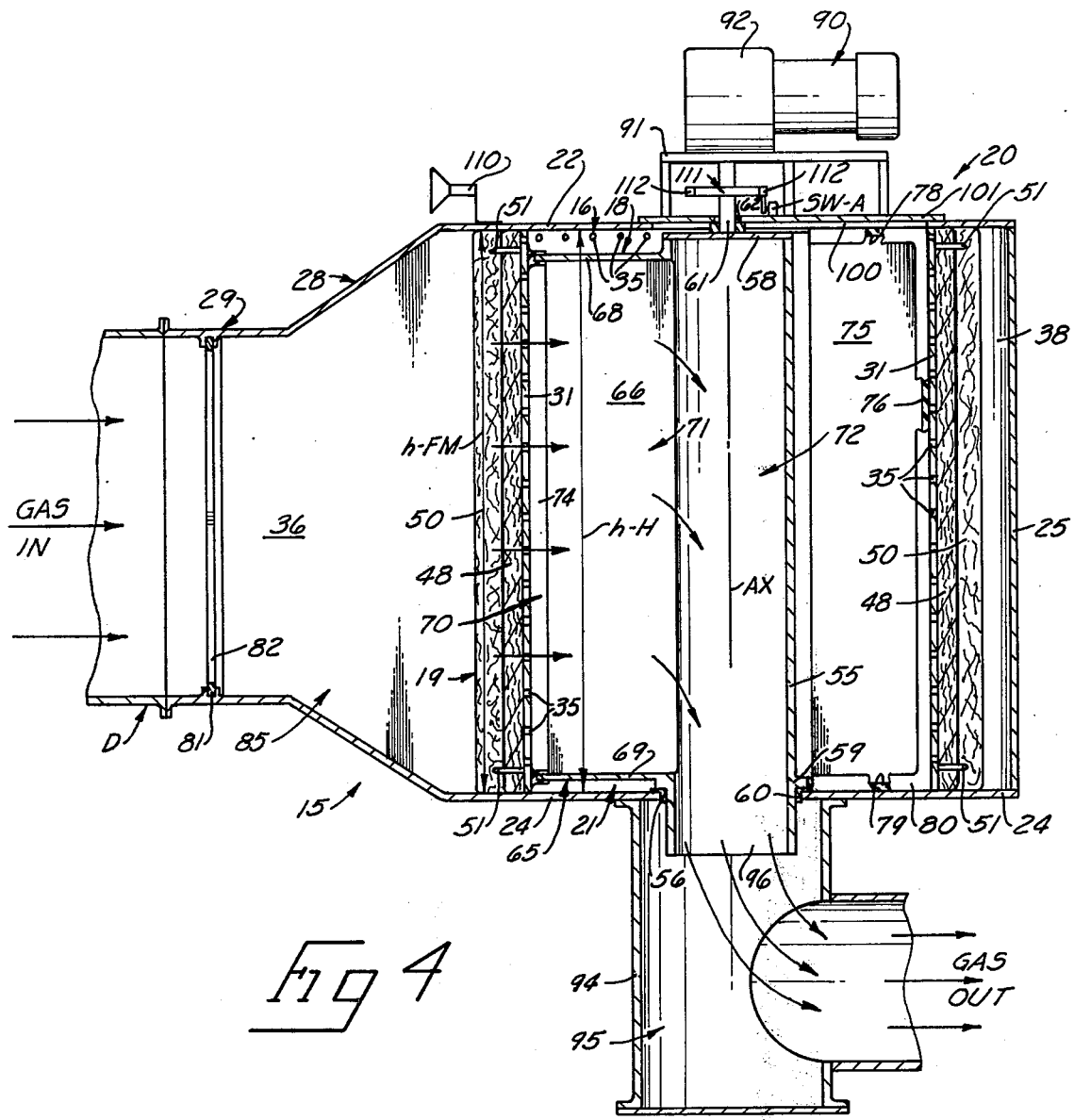
FIG. 4 is a longitudinal cross-sectional view taken generally along line 4—4 of FIG. 3; and, FIG. 5 is a schematic diagram illustrating the control system of the invention.

Referring to FIGS. 3 and 4, it will be seen that the housing 15 includes a generally cylindrical section 20 which defines a generally cylindrical filtration chamber 21 therein. The cylindrical section 20 includes generally a circular top wall 22, a circular bottom wall 24, and an annular side wall 25 joining the top wall 22 and bottom wall 24 to define the chamber 21 therein. An inlet opening 26 is defined through the side wall 25 to chamber 21 and is connected to the duct D from which the gas stream with the particulate matter entrained therein is being discharged through a transition duct section 28 and a damper duct section 29 so that the incoming gas stream is diffused from the damper duct section 29 to the filtration chamber 21 through the transition duct section 28. The filter media support drum 16 is mounted in the filtration chamber 21 concentrically about the central axis AX of the cylindrical section 20 of housing 15. The support drum 16 has an annular side wall 31 which extends between the top wall 22 and bottom wall 24 of the housing 15 and is sealed to each so that the side wall 31 divides the filtration chamber 21 into an outer annular inlet subchamber 32 and an inner cylindrical subchamber 34. The annular sidewall 31 of support drum 30 is perforated as indicated at 35 so that the incoming gas stream can be drawn through the perforations 35 in the drum wall 31. It will be noted that the support drum 16 has a diameter $d$-D which is smaller than the diameter $d$-H of the side wall 25 of the cylindrical section 20 of housing 15 so that the outer subchamber 32 has a cross-sectional width $w$-OS. It will further be noted that the housing 15 is provided with a front inlet baffle 36 oriented generally parallel to the axis AX of the housing 15 and extends from the damper duct section 29 to the annular side wall 31 of the support drum 16. The inlet baffle 36 also extends from the top to the bottom of the damper duct section 29 and the transition duct section 28 as well as from the top wall 22 of the cylindrical section 20 to the bottom wall 24 of the cylindrical section 20 so that the gas stream entering the housing 15 through the damper duct section 29 may pass along either of two separate gas stream paths. A rear baffle 38 also oriented generally parallel to the central axis AX of the housing 15 extends between the perforated drum side wall 31 and the annular side wall 25 of the cylindrical section 20 diametrically opposite the front inlet baffle 36. The rear baffle 38 extends between the top wall 22 and bottom wall 24 of the cylindrical section 20 so that the outer annular inlet subchamber 32 is divided into a first semi-annular subchamber section 39 and a second semi-annular subchamber section 40. As will become more apparent, the gas stream entering the housing 15 will alternately be drawn into the first semi-annular subchamber section 39 or into the second semi-annular subchamber section 40.

The annular side wall 25 of the cylindrical section 20 of housing 15 is provided with a first access opening 41 therethrough which opens into the first semi-annular subchamber 39 and is also provided with a diametrically opposite second access opening 42 which opens into the second semi-annular subchamber 40. Each of the access openings 41 and 42 can be selectively closed by an arcuate door 44 which is hinged to the side wall 25 at hinges 45 so that the access doors 44 can be selectively opened to gain access to the semi-annular subchamber sections 39 and 40. An appropriate seal 46 is provided about each of the access doors 44 to selectively seal the access openings 41 or 42 when the doors 44 are closed. An appropriate latch (not shown) is provided to selectively keep the access doors 44 closed so that the seals 46 seal the access openings 41 or 42 to the doors 44.

The filter media 19 includes a first filter media member 48 positioned within the first semi-annular subchamber section 39 against the outside of the perforated side wall 31 of the support drum 16 and a second filter media member 49 positioned in the second semi-annular subchamber 40 against the outside of the perforated side wall 31 of the filter media support drum 16. The filter media members 48 and 49 have a length slightly longer than the circumferential distance around the side wall 31 of the drum 30 between the front baffle 36 and the rear baffle 38 so that when the filter media members 48 and 49 are positioned against the perforated side wall 31 of the drum 16, the opposite ends of the filter media members 48 and 49 form outwardly turned sections 50 which lie against the front baffle 36 and rear baffle 38 in a sealing relationship therewith. To hold the filter media members 48 and 49 in position, hold down pins 51 are provided on the perforated side wall 31 of the support drum 16 adjacent the front baffle 36 and the rear baffle 38. The height $h$-FM of the filter media members 48 and 49 is substantially equal to the height of the side walls 31 of the support drum 16 so that the gas stream must pass through the filter members 48 or 49 as it passes from the semi-annular subchambers 39 and 50 into the interior of the support drum 30 through the perforated side wall 31.

The suction head 18 is rotatably mounted between the top wall 22 and bottom wall 24 of the housing 15 so that it is rotatable about the axis AX of the housing 15. The suction head 18 includes generally a cylindrical tubular central section 55 with a prescribed diameter $d$-TS considerably smaller than the diameter $d$-D of the support drum 30. The central section 55 is oriented so that its central axis is coaxial with the axis AX of the housing 15. The tubular section 55 has a height greater than the height $h$-H of the filtration chamber 21 and projects through an appropriate central opening 56 in the bottom wall 24 of the housing 15. The upper end of the central tubular section 55 lies adjacent the top wall 22 of the housing 15 and is closed by a circular end plate 58. An annular support flange 59 is provided about central tubular section 55 just above the bottom wall 24 of the housing 15 and is rotatably mounted in a bearing 60 in the bottom wall 24 about the opening 56 so that the support flange 59 supports the suction head 18 in the housing 15. The circular end plate 58 on the tubular section 55 is provided with an upstanding drive shaft 61 centrally thereon which projects through an appropriate opening 62 in the top wall 22 of the housing 15 so that the shaft 61 can be engaged to selectively rotate the suction head 18. The suction head 18 is usually sealed with respect to the opening 62 in the top wall 22 and the opening 56 in the bottom wall 24 as will become more apparent.

A side inlet tube 65 is joined to the central tubular section 55 and extends generally radially outwardly therefrom. The side inlet tube 65 has a rectelinear cross-sectional shape with opposed side walls 66, top wall 68 and bottom wall 69. The length L-IT of the inlet tube 65 is such that its outer inlet end 70 lies adjacent the inside of the perforated side wall 31 of the support drum 16. The inlet passage 71 through the side inlet tube 65 opens onto the outer inlet end 70 of the tube 65 at the perforated side wall 31 of the support drum 16 and opens into the cylindrical discharge passage 72 in the central tubular section 55 at its inner end. A sealing gasket 74 is provided about the outer inlet end 70 of the side inlet tube 65 to seal the outer inlet end 70 to the inside of the perforated annular side wall 31 of the support drum 16. Thus, it will be seen that the gas stream in the subchamber section 39 and 40 opposite the outer inlet end 70 of the side inlet tube 65 can be drawn into the discharge passage 72 in the central tubular section 55 through the inlet passage 71 in the side inlet tube 65. The inlet passage 71 has a precribed width $w$-IP which determines the face velocity of the gas stream flowing through the filter media member 48 or 49 as will be more fully explained.

A suction head baffle 75 is carried by the central tubular section 55 of the suction head 18 and extends radially outwardly therefrom diametrically opposite the side inlet tube 65. The baffle 75 has a length L-B such that the outer projecting end 76 of the baffle 75 lies adjacent the inside of the perforated side wall 31 of the support drum 16 while the upper edge 78 of the baffle 75 lies adjacent the top wall 22 of the housing 15 and the lower edge 79 of the baffle 75 lies adjacent the bottom wall 24 of the housing 15. A baffle sealing gasket 80 is provided around the upper and lower edges 78 and 79 and the outer projecting end 76 of the suction head baffle 75 which engages the top wall 22 and bottom wall 24 of the housing 15 as well as the inside of the perforated side wall 31 of the support drum 16 to seal the baffle 75 with respect thereto. The baffle 75 serves to reduce the nagative pressure exerted on the inside of the drum 16 behind the filter media member 48 or 49 opposite the member 48 or 49 through which the suction head 18 is drawing the gas stream if there is leakage about the sealing gasket 74 on the outer inlet end 70 of the side inlet tube 65 as will become more apparent.

To assist in manually removing the filter media member 48 or 49 which is not being used, a slide gate damper 81 is provided in the damper duct section 29. The slide gate damper 81 is a thin rectilinear member which has an effective length L-D about equal to twice the width w-I of the passage through the damper duct section 29. The slide gate damper 81 is slidably received through the damper duct section 29 in a sealing relationship therewith and with the leading end of the front inlet baffle 36. The slide gate damper 81 defines first and second openings 82 and 84 which are selectively alignable with the first inlet subpassage 85 to the first semi-annular subchamber section 39 and the second inlet subpassage 86 to the second semi-annular subchamber section 40 as seen in FIG. 3. It will be noted that the slide damper 81 projects outwardly on opposite sides of the damper duct section 29 and is provided with a handle 88 at opposite ends thereof which can be manually engaged to slide the slide gate damper back and forth across the damper duct section 29. When the slide gate damper 81 is moved to the right until the handle 88 on the left hand end thereof as seen in FIG. 3, abutts the damper duct section 29, it will be seen that the second opening 84 will be aligned with the first inlet subpassage 85 and the first opening 82 will lie outside of the duct section 29. Thus, it will be seen that the slide gate damper 81 now closes off the second inlet subpassage 86 to block the flow of the gas stream into the second semi-annular subchamber 40. This is usually done when the outer inlet end 70 of the side inlet tube 65 on suction head 18 has just moved behind the first filter media member 48 as seen in FIG. 3. In this position, the access door 44 to the second semi-annular subchamber section 40 can be opened and the second filter media member 49 can be replaced without interrupting the operation of the filtration assembly 10. Because very little of that portion of the perforated side wall 31 on the support drum 16 can communicate with the gas stream flowing into the first semi-annular subchamber section 39 in this position, the suction head 18 will continue to draw the gas stream through the first filter media member 48 even if there is some leakage about the outer inlet end 70 of the side inlet tube 65. Once the second filter media member 49 has been replaced, the slide gate damper 81 is moved back to the position seen in FIG. 3 so that the gas stream can enter the second semi-annular subchamber section 40 when the suction head 18 has rotated therebehind. This procedure is then reversed to remove the first filter media member 48 and replace it.

Figure 5:
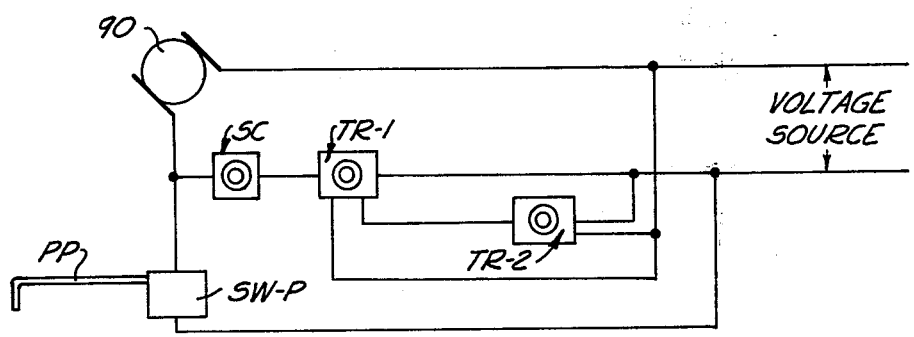

A suction head drive motor 90 for rotating the suction head 18 is mounted on a support 91 on the top wall 22 of the housing 15 and is connected to the upwardly projecting drive shaft 61 on the suction head 18 through a gear reducer 92 so that the drive motor 90 rotates the suction head 18 when it is operated. Referring to FIG. 5, it will be seen that the drive motor 90 is powered from a convenient voltage source. The drive motor 90 may be controlled by a first timer TR-1 which controls the time the drive motor 90 rotates the suction head 18 each time it is activated and a second timer TR-2 which controls the period of time between the times the suction head 18 is advanced by the motor 90. An appropriate speed controller SC may be used either in conjunction with timers TR-1 and TR-2 or separately from the timers TR-1 and TR-2 to control the rotational speed of motor 90 and thus suction head 18. If the speed controller SC is used separately, then the suction head 18 is to be continuously rotated by the motor 90 at a sufficiently slow rate to properly load the filter media members 48 and 49 as will become more apparent.

Alternatively, the motor 90 may be controlled by a pressure activated switch SW-P seen in FIG. 5 with a pressure pick-up PP positioned to measure the pressure drop across the filter media 19. When the pressure drop exceeds a first prescribed value, usually about 35 inches w.g., the switch SW-P operates motor 90 to rotate the suction head 18. When the suction head 18 has rotated sufficiently behind a fresh portion of the filter media 19 for the pressure drop thereacross to be lowered to a second value, usually about 25 inches w.g., the switch SW-P stops motor 90 and the rotation of suction head 18 until the first prescribed value is again reached and the advancement process is again repeated. The pressure measurement may be made by comparing the inlet pressure to the device 11 with atmospheric pressure. The suction head would be advanced when this inlet pressure is about equal to atmospheric pressure and would be stopped when the inlet pressure is a few inches water gauge negative.

Figure 2:
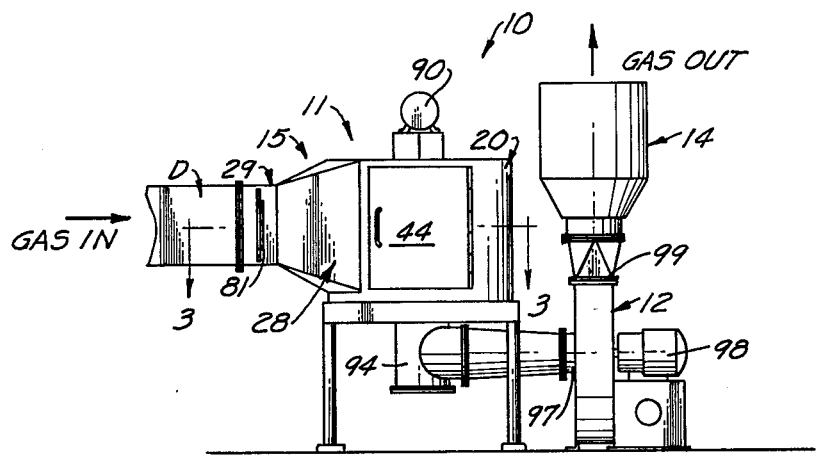
FIG. 2 is a side elevational view of that embodiment of the invention shown in FIG. 1.

As best seen in FIG. 4, an elbow 94 is provided outside the bottom wall 24 of the housing 15 about the central opening 56 through which the central tubular section 55 of the suction head 18 projects. The elbow 94 defines a right angle passage 95 therethrough which is sealed to the bottom wall of the housing 15 about the discharge outlet 96 of passage 72 through the tubular section 55 of the suction head 18 at its lower end. The elbow 94 is connected to the intake 97 of the induced draft fan 12 so that when the blower in the fan 12 is rotated by the drive motor 98 as seen in FIG. 2, the fan 12 will create a suction through the suction head 18 to draw the gas stream with the particulate matter entrained therein through the filter media members 48 and 49 where the particulate matter is separated in the filter media members 48 and 49 and the cleaned gas stream is drawn out through the fan 12. The discharge 99 of the fan 12 is connected to the mist eliminator 14 which separates any large entrained liquid droplets from the gas stream passing out of the fan 12 as will be explained.

Since it is desirable to maintain the face velocity of the gas glow through the filter media members 48 and 49 within a prescribed range, varying the cross sectional size of the inlet passage 71 through the side inlet tube 65 will maintain the face velocity range of the gas flow through the filter media members 48 and 49 even though the gas volume flow rate of the filtration and agglomerator device 11 is changed. To assist in changing the suction head 18 to easily change the cross-sectional dimensions of the inlet passage 71 in the side inlet tube 65, an access opening 100 may be provided through the top wall 22 of the housing 15 through which the suction head 18 can be removed when it is aligned therewith. An appropriate access cover plate 101 may be provided for closing the access opening 100 when the suction head is in place as seen in FIG. 4.

In order that plant personnel realize when the filter media member 48 or 49 needs replacing, an alarm 110 is sounded. The alarm 110 seen in FIG. 4 may be activated through a cam 111 with opposed lugs 112 that close a switch SW-A. The cam 111 is carried on and rotated by drive shaft 61. The lugs 112 are oriented so that the alarm 110 will be sounded each time the suction head 18 has moved from one end of each filter media member 48 or 49 to the other and has started using the fresh filter media member 48 or 49. Also an appropriate indicator may be provided to indicate which filter media member to change.

OPERATION

As indicated hereinbefore, the filtration assembly 10 operates according to the method disclosed in U.S. Pat. No. 3,745,748. Basically, the filter media 19 is a fiber glass mat made up of randomly arranged glass fibers having a diameter of about 3–5 microns and a density of about 0.66 oz/ft$^2$. These mats are about 1 inch thick. The gas stream is sucked through the filter media 19 at a face velocity of between about 1,300 and 1,800 feet/min which collapses the filter media 19 to a thickness of about ¼ inch. The pressure drop maintained across the filter media 19 at the inlet end 70 to inlet passage 71 of the suction head 18 is usually about 25–35 inches water gauge. This serves to collect in excess of about 90% of the sticky, oily, or liquid aerosol particulate matter from the gas stream passing therethrough even if the particular matter is in the sub-micron range. The higher viscosity particulate material is entrapped in the filter media 19 while the lower viscosity liquid particulate matter is initially separated from the gas stream in the filter media 19 but slowly migrates through the filter media 19 and agglomerates into larger liquid droplets which are subsequently sucked off of the back side of the filter media 19 as large liquid droplets. These droplets pass through the induced draft fan 12 but are impacted on the mist eliminator 14 which is usually a mesh type demister that easily separates these large liquid droplets from the gas stream passing therethrough. Thus, the gas stream passing out of the mist eliminator 14 is clean. Where little or no lower viscosity particulate matter is present in the gas stream, the mist eliminator 14 may not be required.

Because of more viscous particulate matter is entrapped in the filter media 19, the level of particulate matter remaining in the filter media 19 eventually begins to build up to blind the filter media 19 through which the gas stream is drawn. The rotation of the suction head 18 is adjusted so that the outer inlet end 70 of the side inlet tube 65 is at least partly shifted away to a new unused portion of the filter media 19 before the filter media 19 through which the gas stream is being directed has collected a sufficient level of particulate matter therein to cuase it to blind off and generate an undesirably large pressure drop across the filter media 19. This can be accomplished by adjusting the speed controller SC and/or the timers TR-1 and TR-2 or by using the pressure switch SW-P. It is to be understood that the amount and type of particulate matter in the gas stream will usually be slightly different for each application. The control circuit allows the rotational speed of the suction head 18 to be rotated about the filter media members 48 and 49 at a rate such that maximum use of the filter media members 48 and 49 be attained. Usually, at least about 20 hours use is obtained from each filter media member 48 or 49.

When the suction head 18 is rotated past the filter media member 48 or 49, the alarm 110 is sounded so that plant personnel can change the used filter media member 48 or 49. The plant personnel can then move the slide gate damper 81 to block the gas flow from the appropriate subchamber section 39 or 40 and open the appropriate access door 44 to gain access to the used filter media member 48 or 49. After the used filter media member is removed, a fresh filter media member can be installed and hooked over the hold down pins 51 to hold it in place. The door 44 is then closed and the slide gate damper 81 moved back to open both subchamber sections 39 and 40 to the incoming gas flow.

It is also to be understood that the fan driving the gas stream through the device 11 may be placed upstream of device 11 to cause the device to operate under positive pressure.

We claim:

1. A filtration device for removing particulate matter entrained in a gas stream comprising:

a housing defining a generally cylindrical filtration chamber therein of a first prescribed diameter having a central axis and a main gas inlet to said filtration chamber through which the gas stream enters said housing chamber;

a support drum mounted in said filtration chamber and including an annular perforated side wall concentric about said central axis with a second prescribed diameter smaller than said first prescribed diameter to define an annular inlet subchamber in said filtration chamber between said drum and said housing;

a suction head rotatably mounted on said housing within said support drum for rotation about said central axis, said suction head including a suction head gas inlet adjacent the inside of said support drum and movable around said drum as said suction head is rotated and including a suction head gas outlet about said central axis extending out of said housing, said suction head further including sealing means about said suction head gas inlet for forming a substantially gas tight seal between said suction head gas inlet and said perforated drum side wall as said suction head is rotated so that the gas stream entering said housing can only pass out of said housing through that portion of said perforated drum side wall in registration with said suction head gas inlet, said suction head gas inlet, and said suction head gas outlet;

filter media removably positioned on said perforated side wall of said support drum within said inlet subchamber so that the gas stream passing from said inlet subchamber into said suction head must pass through that portion of said filter media in registration with said suction head gas inlet; and, fan means operatively connected to said suction head gas outlet to cause the gas stream entering said main gas inlet to be drawn into said inlet subchamber, then through that portion of said filter media and said perforated side wall of said support drum aligned with said gas inlet to said suction head, then into said suction head gas inlet and finally out said suction head gas outlet whereby the particulate matter is separated from the gas stream by that portion of said filter media in registration with said suction head gas inlet.

2. The filtration device of claim 1 further including baffle means for separating said inlet subchamber into a first semi-annular subchamber section and a second semi-annular subchamber section, and wherein said filter media includes a first filter media member removably positioned on said perforated side wall of said support drum within said first semi-annular subchamber section and a second filter media member removably positioned on said perforated side wall of said support drum within said second semi-annular subchamber section so that said first filter media member can be replaced while the gas stream is being drawn into said suction head through said second filter media member and said second filter media member can be replaced while the gas stream is being drawn into said suction head through said first filter media member.

3. The filtration device of claim 2 further including damper means for selectively preventing the flow of the gas stream into said first semi-annular subchamber section and into said second semi-annular subchamber section.

4. The filtration device of claim 1 further including drive means for rotating said suction head about said central axis in a first direction.

5. The filtration device of claim 4 wherein said drive means further includes control means for controlling the time duration said suction head is rotated in said first direction.

6. The filtration device of claim 5 wherein said control means further controls the time interval between each rotation of said suction head.

7. The filtration device of claim 4 further including control means operatively connected to said drive means for controlling the operation of said drive means, said control means responsive to a first higher pressure drop across said filter media to cause said drive means to rotate said suction head and responsive to a second lower pressure drop across said filter media to stop the rotation of said suction head.

8. The filtration device of claim 1 wherein said fan means has a suction inlet and a discharge outlet, said suction inlet connected to said suction head gas outlet of said suction head to draw said gas stream through said filter media and said suction head.

9. The filtration device of claim 1 further including mist eliminator means connected to said fan means for removing large liquid droplets passing out of said suction head.

10. The filtration device of claim 1 wherein said suction means is effective to maintain a face velocity of the gas stream through said filter media of about 1300–1800 feet per minute and said filter media is a glass fiber mat made up of glass fibers having a diameter of about 3–5 microns.

11. A method of removing particulate matter entrained in a gas stream comprising the steps of:
   a. positioning a filter media with a prescribed surface area so that one side thereof is in communication with the gas stream with the particulate matter entrained therein;
   b. positioning a suction head defining a suction inlet therein with a second prescribed cross-sectional area smaller than said first prescribed surface area of said filter media on that side of said filter media opposite the side in communication with the gas stream so that the gas stream is drawn into the suction inlet of said suction head through said filter media to separate the particulate matter from the gas stream; and
   c. moving said suction head along the length of said filter media so that substantially all of the filter media is eventually used.

* * * * *